US012687419B2

(12) United States Patent
Morris

(10) Patent No.: US 12,687,419 B2
(45) Date of Patent: Jul. 21, 2026

(54) LIQUID LEVEL GAUGE

(71) Applicant: American Tank Gauge, Incorporated, Chickasha, OK (US)

(72) Inventor: Jerry Morris, Chickasha, OK (US)

(73) Assignee: American Tank Gauge, Incorporated, Chickasha, OK (US)

( * ) Notice: Subject to any disclaimer, the term of this patent is extended or adjusted under 35 U.S.C. 154(b) by 231 days.

(21) Appl. No.: 18/347,305

(22) Filed: Jul. 5, 2023

(65) Prior Publication Data

US 2024/0011815 A1 Jan. 11, 2024

Related U.S. Application Data

(60) Provisional application No. 63/367,768, filed on Jul. 6, 2022.

(51) Int. Cl.
*G01F 23/42* (2006.01)
*G01F 23/76* (2006.01)
(52) U.S. Cl.
CPC .............. *G01F 23/42* (2013.01); *G01F 23/76* (2013.01)
(58) Field of Classification Search
CPC .......... G01F 23/30; G01F 23/40; G01F 23/42; G01F 23/76
See application file for complete search history.

(56) References Cited

U.S. PATENT DOCUMENTS

| | | | | |
|---|---|---|---|---|
| 7,066,024 B2 * | 6/2006 | Watchel | .............. | G01F 23/0038 73/321 |
| 2005/0235749 A1 * | 10/2005 | Morris | .................... | G01F 23/40 73/313 |
| 2010/0288042 A1 * | 11/2010 | Rose | .................... | G01F 23/0038 73/309 |

* cited by examiner

*Primary Examiner* — Benjamin R Schmitt
(74) *Attorney, Agent, or Firm* — Dunlap Codding, P.C.

(57) ABSTRACT

A liquid level gauge has a scale, a first float, a second float, a first level indicator, and a second level indicator. The scale is positioned on a sidewall of a storage tank containing two liquids. The first float is positioned in the tank and weighted to maintain buoyancy on the surface of a first liquid. The second float positioned in the tank and weighted to maintain buoyancy on the surface of a second liquid. The first level indicator is suspended adjacent the scale and connected to the first float to be responsive to changes in the level of the surface of the first liquid. The second level indicator is suspended in the level indicator cover vertically below the first level indicator and connected to the second float to be responsive to changes in the level of the surface of the second liquid.

15 Claims, 6 Drawing Sheets

LIQUID LEVEL GAUGE

CROSS-REFERENCE TO RELATED APPLICATIONS

The present application claims the benefit of U.S. Provisional Application Ser. No. 63/367,768, filed Jul. 6, 2022, which is hereby expressly incorporated by reference herein in its entirety.

BACKGROUND

Gauges are commonly utilized in various industries to measure the level of a liquid in a container or tank. In the petroleum industry, gauges are used to measure the level of a liquid in a storage tank. However, in the production of hydrocarbons, water, and hydrocarbon liquids are often found in the same tank. Because water has a specific gravity greater than the hydrocarbon liquids, the water and the hydrocarbon liquids separate, with the water settling to the bottom of the tank and the hydrocarbon liquids laying on top of the water.

Because there are two distinct liquids with two distinct levels, it is desirable to know the level of each liquid. Gauges capable of measuring two liquids within the same tank have been previously proposed. However, such gauges have not been readily accepted due to their complexity and inconvenience of use.

To this end, a need exists for a liquid level gauge that can measure the level of at least two liquids in a tank and read easily and quickly by an individual at ground level on the exterior side of the tank. To such a liquid level gauge, the inventive concepts disclosed herein are directed.

DETAILED DESCRIPTION OF EXEMPLARY EMBODIMENTS

Figure 1:
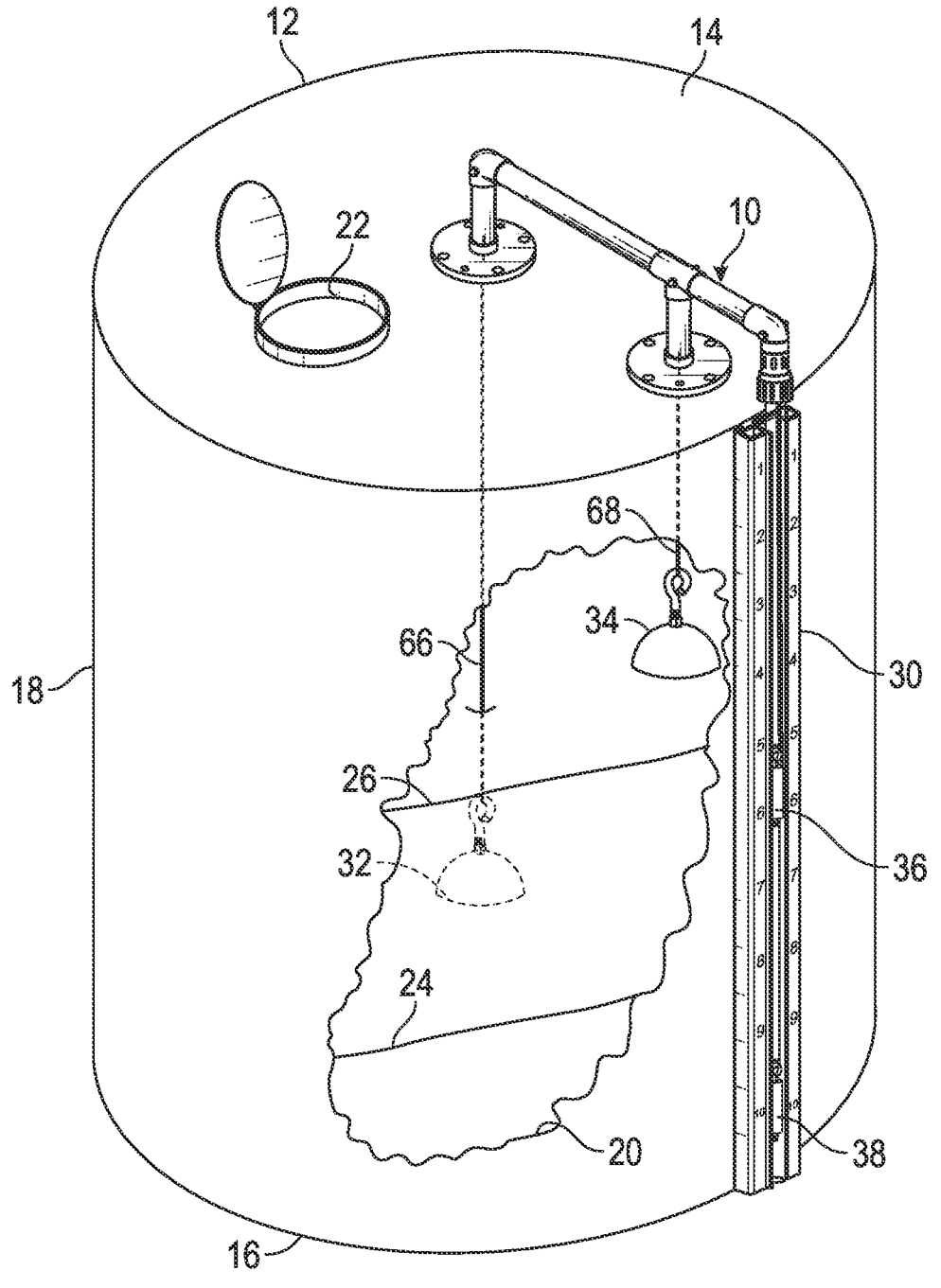
FIG. 1 is a partially cut-away, perspective view of a liquid level gauge constructed in accordance with the inventive concepts disclosed herein shown mounted to a tank for measuring the level of the liquids contained in the tank.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein are for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and more particularly to FIG. 1, a liquid level gauge 10 constructed in accordance with the inventive concepts disclosed herein is shown mounted to a storage tank 12. The storage tank 12 is of the type positioned above ground and includes a top wall 14, a bottom wall 16, and a sidewall 18; all cooperating to define an interior space 20. The top wall 14 is provided with a hatch 21 to provide access to the inner space 20. The inner space 20 of the storage tank 12 is shown to contain a first liquid 24 and a second liquid 26. The first liquid 24 has a specific gravity that is greater than the specific gravity of the second liquid 26. As such, the first liquid 24 settles toward the bottom wall 16 of the storage tank while the second liquid 26 floats on top of the first liquid 24. It will be appreciated that the first liquid 24 may be water while the second liquid 26 may be a hydrocarbon liquid insoluble in water and thereby results in a distinct line of demarcation between the water and hydrocarbon liquid which permits the level of the first liquid 24 and level of the second liquid 26 to be measured separately.

Figure 2:
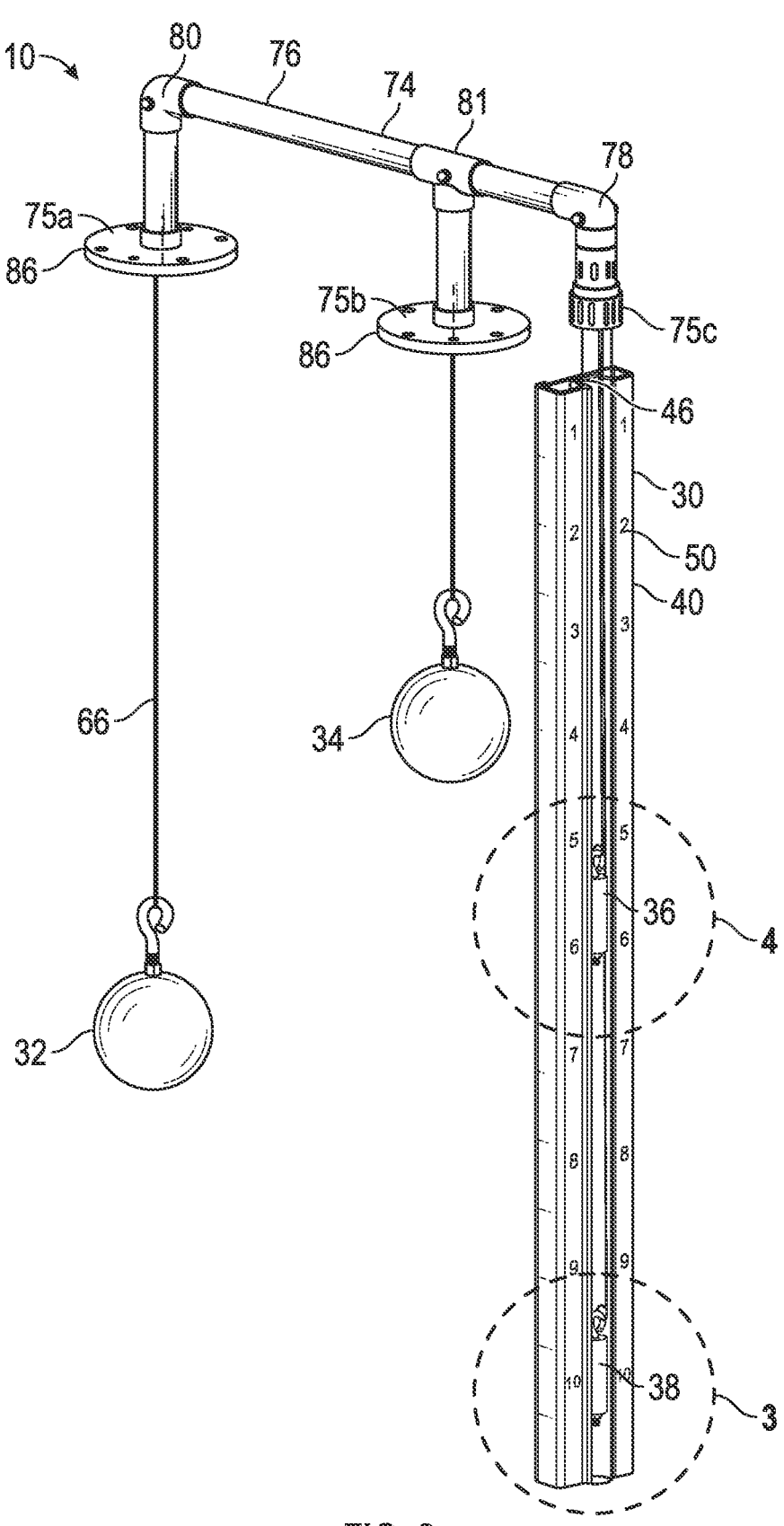
FIG. 2 is a perspective view of the liquid level gauge of FIG. 1.

Referring now to FIGS. 1 and 2, the liquid level gauge 10 includes a scale 30, a first float 32, a second float 34, a first level indicator 36, and a second level indicator 38. The scale 30 is positioned on the exterior surface of the sidewall 18 on the storage tank 12 to permit an individual to read the level of the first liquid 24 and the level of a second liquid 26 while at ground level on the exterior side of the storage tank 12. The first float 32 is positioned in the storage tank 12 and weighted to maintain buoyancy on the surface of the first liquid 24. The second float 34 is positioned in the storage tank 12 and weighted to maintain buoyancy on the surface of the second liquid 26. The first level indicator 36 is suspended adjacent to the scale 30 and connected to the first float to be responsive to changes in the surface of the first liquid 24 and thereby provide a visual indicator of the level of the first liquid 24 in the storage tank 12. The second level indicator 38 is suspended vertically below the first level indicator 36 adjacent the scale 30 and connected to the second float 34 to be responsive to changes in the level of the surface of the second liquid 26 and thereby provide a visual indicator of the level of the second liquid 26 in the storage tank 12.

The scale 30 includes a panel member 40 and a level indicator cover 42. The panel member 40 is sized and shaped to be positioned along the exterior side of the sidewall 18 of the storage tank 12 to extend from the top wall 14 to the bottom wall 16. As shown, the panel member 40 is substantially rectangularly shaped and provided with a channel 46 for receiving the level indicator cover 42. The channel 46 is formed along the length of the panel member 40. The panel member 40 may be constructed of any suitable material, such as plastic, fiberglass, wood, or aluminum.

The level indicator cover 42 may be a transparent tube sized to be positioned in the channel 46. As will be described in greater detail below, the level indicator cover 42 functions to house both the first level indicator 36 and the second level indicator 38 to permit the first and second level indicators 36 and 38 to travel in an up and down motion in response to changes in the level of the first and second liquids 24 and 26 and thereby provide a visual indicator of the level of the first and second liquids 24 and 26 without being affected by outside elements, such as wind and rain, which would interfere with reading the level of the first and second liquids 24 and 26. While the level indicator cover 42 is shown to be tubular, it should be appreciated that the level indicator cover 42 may be constructed in a variety of configurations so long as the first and second level indicators 36 and 38 are visible and capable of traveling freely in an up and down motion along the length of the panel member 40. For example, the level indicator cover 42 could have a semicircular shape rather than a circular shape. The level indicator cover 42 is secured in the channel 46 of the panel member 40 in a suitable fashion, such as with fasteners or adhesive.

The panel member 40 is provided with a plurality of markings 50 extending from a lower end of the panel member 40 to an upper end of the panel member 40. The markings 50 are a reference in measuring the first and second liquids 24 and 26 in the storage tank 12. The markings 50 may be formed as one or two columns of numbered marks positioned along the level indicator cover 42. The markings 50 may be applied to the panel member 40 in a suitable fashion that permits the markings to be easily seen by an individual. It will be appreciated that the number and spacings of the markings 50 can be varied widely depending on the accuracy of measurement one desires.

The scale 30 is adapted to be mounted to the exterior side of the sidewall 18 of the storage tank 12 without damaging or affecting the mechanical integrity of the storage tank 12. An example of a suitable way of mounting the scale 30 to the storage tank 12 is disclosed in U.S. Pub. No. 2005/0235749, which is expressly incorporated herein by reference.

Referring again to FIGS. 1, 2, and 9, the first and second floats 32 and 34 are preferably hollow spheres constructed of stainless steel. However, it should be understood that any material which permits the first and second floats 32 and 34 to float on the surface of a liquid may be used to construct the first and second floats 32 and 34.

Figure 9:
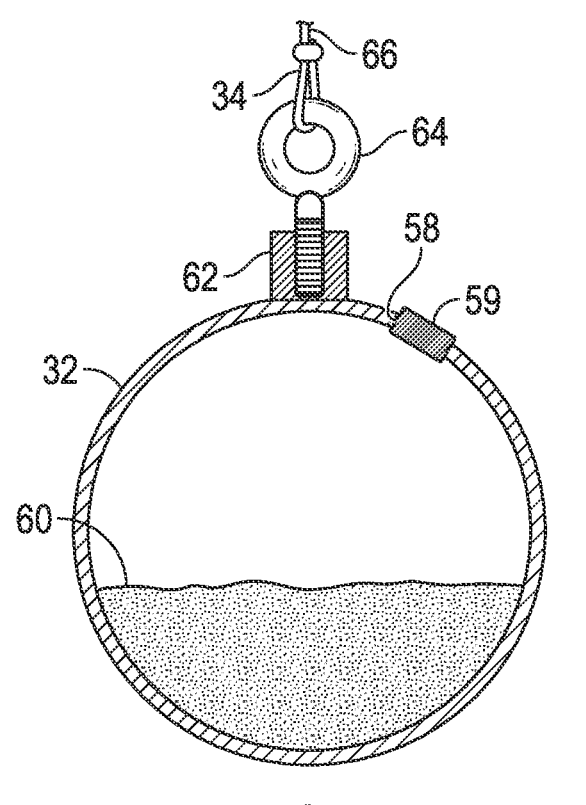
FIG. 9 is a cross-sectional view of a float.

As best shown in FIG. 9, the first float 32 has an opening 56 and a plug 58. The opening 58 permits a ballast material 60 to be disposed within the first float 32 to weigh the first float 32 to maintain buoyancy on the surface of the first liquid 24. When the first liquid is water, desirable results are obtained when the first float 32 is provided with an amount of ballast material 60, such as sand, which causes the first float 32 to weigh approximately 4 lb. 6 oz. The second float 34 is constructed in a manner similar to the first float 32. However, desirable results are obtained when the second float 34 is provided with a ballast material which causes the second float 34 to weigh approximately 1 lb. to approximately 1 lb. 6 oz. The ballast required will vary depending on the properties of the liquid in which the first and second floats 32 and 34 are disposed.

The first float 32 and the second float 34 are provided with a coupling 62 to receive a connector member 64, such as an eye bolt. The connector member 64 of the first float 32 is adapted to be connected to one end of an elongated flexible connector, such as a cable 66, while the connector member 64 of the second float 34 is adapted to be connected to one end of another elongated flexible connector, such as a cable 68. The cables 66 and 68 connect the first and second floats 32 and 34 to the first and second level indicators 36 and 38, respectively. It should be appreciated that the elongated flexible connectors may also be cords, ropes, wires, strands, and threads, by way of example.

Figure 3:
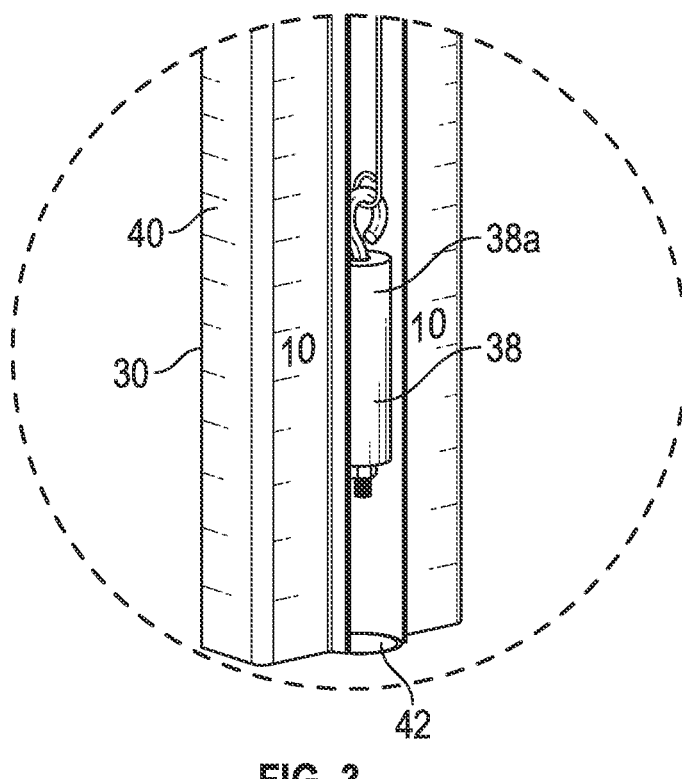
FIG. 3 is an enlarged view of the encircled area 3 of FIG. 1 illustrating a first level indicator.
Figure 4:
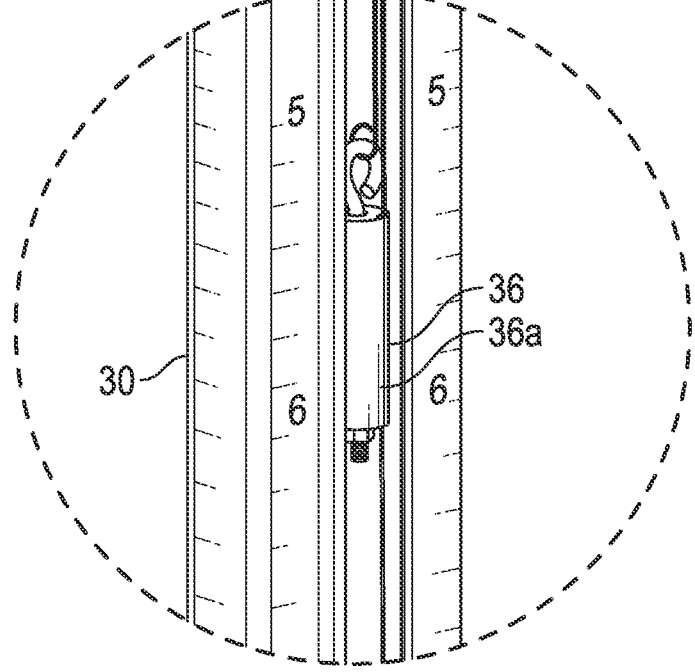
FIG. 4 is an enlarged view of the encircled area 4 of FIG. 1 illustrating a second level indicator.

Referring now to FIGS. 3 and 4, the first and second level indicators 36 and 38 may include cylindrical members 36*a* and 38*b*, respectively, sized to be positioned within the level indicator cover 42. In one embodiment, the first and second level indicators 36 and 38 are constructed of stainless steel; however, any durable material with sufficient weight to move in response to the movement of its corresponding float may be used.

Figure 5:
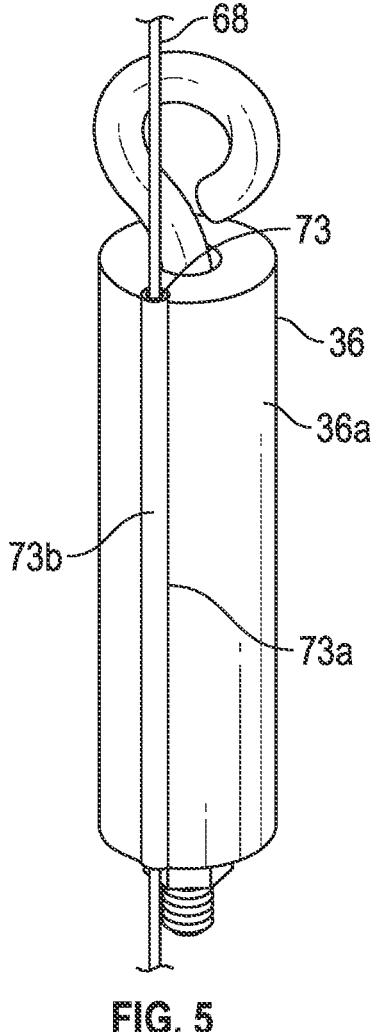
FIG. 5 is a perspective view of the second level indicator.
Figure 6:
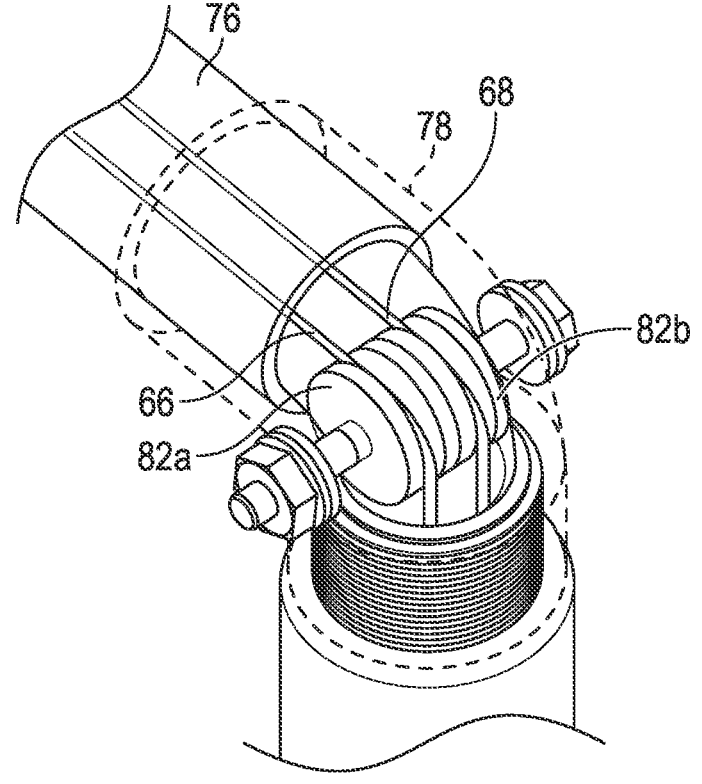
FIG. 6 is a cutaway, perspective view of a first pulley assembly.
Figure 7:
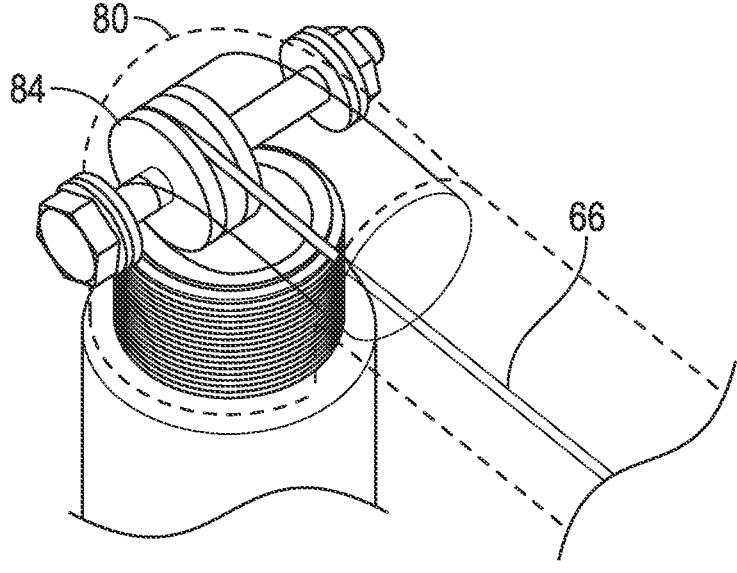
FIG. 7 is a cutaway, perspective view of a second pulley assembly.
Figure 8:
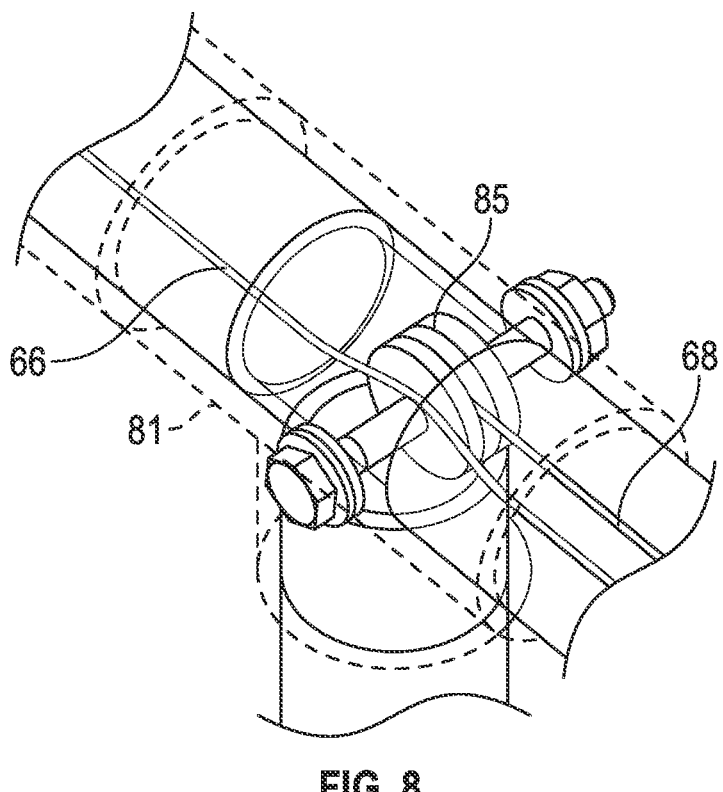
FIG. 8 is a cutaway, perspective view of a third pulley assembly.

To permit the second level indicator 38 to be suspended vertically below the first level indicator 36, the cylindrical member 36*a* has a vertical passage 73 extending through cylindrical member 36*a* from an upper end to a lower end so the cable 68 connected to the second level indicator 38 extends through the vertical passage 73 of the first level indicator 36 to be slidable relative to the first level indicator 36. In one embodiment, the vertical passage 73 may be formed by drilling the vertical passage 73 through the cylindrical member 36*a* of the first level indicator 36. In another embodiment best illustrated in FIG. 5, the cylindrical member 36*a* is provided with a vertical slot 73*a* formed along an outer surface thereof. A tubular member 73*b* is positioned in the vertical slot 73*a* and connected to the cylindrical member 36*a* in a suitable fashion, such as with epoxy. The tubular member 73*a* may be formed of stainless steel or some other suitable material. The tubular member 73 is sized to permit the cable 68 to slide relative to the tubular member 73 and thus the first level indicator 36, so the second level indicator 38 may move relative to the first level indicator 36, and the first level indicator 36 may move relative to the second level indicator 38.

Referring now to FIGS. 2 and 6-8, the cables 66 and 68 are supported by a housing 74. The housing 74 has first portion 75a mounted to the top wall 14 of the storage tank 12, a second portion 75b mounted to the top wall 14, and a third portion 76c connected to the level indicator cover 42. The housing 74 includes a tubular extension member 76, a first elbow 78 (FIG. 6) connected to one end of the tubular extension member 76, a second elbow 80 (FIG. 7) connected to the other end, and T-fitting 81 (FIG. 8) interposed between the first elbow 78 and the second elbow 80. The first elbow 78 is provided with a pair of parallel pulleys 82a and 82b, and the second elbow 80 is provided with a pulley 84. The T-fitting 81 is provided with a pulley 85. The pulleys 82a and 84 rollingly support the cable 66, so the first level indicator 36 moves along the panel member 40 in response to changes in the level of the first liquid 24. The pulleys 82b and 85 rollingly support the cable 68, so the second level indicator 38 moves along the panel member 40 in response to changes in the level of the second liquid 26. The first portion 75a and the second portion 75b of the housing 74 may be in the form of a slip flange 86, while the third portion 75c mates with the upper end of the level indicator cover 42 thereby forming a continuous enclosure for the cables 66 and 68 extending from the top wall 14 of the storage tank 12 to the level indicator corner 42.

The pulleys 84 and 85 are laterally spaced to allow the first float 34 and the second float 36 to be laterally spaced relative to one another at a distance sufficient so the first float 32 and the second float 34 do not interfere with one another when both are positioned in the storage tank 12.

To install the liquid level gauge 10 on the storage tank 12, the scale 30 is first mounted to the external side of the sidewall 18 of the storage tank 12. In one non-limiting embodiment, the scale 30 is secured to the external side of the sidewall 18 with the magnets so as not to damage or compromise the integrity of the sidewall 18 of the storage tank 12. With the scale 30 mounted to the sidewall 18, the housing 74 is assembled and mated with the level indicator cover 42. The slip flanges 86 of the housing 74 are then positioned on the top wall 14 or the storage tank 12. The position of the slip flanges 86 is marked, and holes are drilled through the top wall 14 of the storage tank 12. The slip flanges 86 are attached to the top wall 14 of the storage tank 12 with suitable fasteners, such as self-setting screws. The cables 66 and 68 are run through the holes formed in the top wall 14 of the storage tank 12. An installer reaches through the hatch 21 and grabs one end of the cables 66 and 68. The cable 66 is attached to the first float 32 and the cable 68 is attached to the second float 34. The other end of the cable 66 is threaded through the housing 74 and over the pulleys 82a and 84, and the other end of the cable 68 is threaded through the housing 74 and over the pulleys 82b and 85.

The cable 68 is threaded through the first level indicator 36 and attached to the second level indicator 38. Before positioning the cable 68 and the second level indicator 38 into the level indicator cover 42, the level of the second liquid 26 is measured with conventional measuring methods, and the second level indicator 38 is positioned accordingly by moving the second level indicator 38 up or down the cable 68 as required until the position of the second level indicator 38 corresponds with the level of the second liquid 26. The cable 68 is then crimped or otherwise secured to the second level indicator 38.

The above-described process is next repeated for installing the first level indicator 36. Regarding calibration of the first level indicator 36, this is accomplished by measuring the level of the first liquid 24 with methods known in the art. When installed on the storage tank 12, the liquid level gauge 10 allows an individual to quickly and easily read the level of the liquids in the storage tank 12 without requiring access to the inner space 20 of the storage tank 12.

Although the presently disclosed inventive concepts have been described in conjunction with the specific language set forth herein above, many alternatives, modifications, and variations will be apparent to those skilled in the art. Accordingly, it is intended to embrace all such alternatives, modifications, and variations that fall within the spirit and broad scope of the presently disclosed inventive concepts. Changes may be made in the construction and the operation of the various components, elements, and assemblies described herein, without departing from the spirit and scope of the presently disclosed inventive concepts.

What is claimed is:

1. A liquid level gauge in combination with a storage tank containing a first liquid and a second liquid separated from the first liquid, the storage tank having a sidewall with an exterior surface, the liquid level gauge comprising:
    a scale positioned on the exterior surface of the sidewall of the storage tank, the scale having a plurality of markings extending from a lower end of the scale to an upper end of the scale;
    a first float positioned in the tank and weighted to maintain buoyancy on the surface of the first liquid;
    a second float positioned in the tank and weighted to maintain buoyancy on the surface of the second liquid;
    a first level indicator suspended adjacent the scale and connected to the first float to be responsive to changes in the level of the surface of the first liquid and thereby provide a visual indicator of the level of the first liquid in the tank; and
    a second level indicator suspended below and vertically aligned with the first level indicator adjacent the scale and connected to the second float so as to be responsive to changes in the level of the surface of the second liquid and thereby provide a visual indicator of the level of the second liquid in the tank.

2. The combination of claim 1, wherein the first level indicator has a vertical passage extending through the first level indicator from an upper end to a lower end, wherein the second level indicator is connected to the second float with a cable, and wherein the cable extends through the vertical passage of the first level indicator to be slidable relative to the first level indicator.

3. The combination of claim 2, wherein the first level indicator has a cylindrical body with a vertical slot formed along an outer surface and a tube positioned in the vertical slot and connected to the cylindrical body.

4. The combination of claim 1, wherein the scale has a level indicator cover extending along the vertical axis of the scale in which each of the first level indicator and the second level indicator is positioned.

5. The combination of claim 4, wherein the level indicator cover is a transparent tube.

6. A liquid level gauge in combination with a storage tank containing a first liquid and a second liquid separated from the first liquid, the storage tank having a sidewall with an exterior surface, the liquid level gauge comprising:
    a panel member positioned on the exterior surface of the sidewall of the storage tank;

a level indicator cover positioned on the panel member to be vertically oriented;

a first float positioned in the tank and weighted to maintain buoyancy on the surface of the first liquid;

a second float positioned in the tank and weighted to maintain buoyancy on the surface of the second liquid;

a first level indicator suspended in the level indicator cover and connected to the first float to be responsive to changes in the level of the surface of the first liquid and thereby provide a visual indicator of the level of the first liquid in the tank; and a second level indicator suspended in the level indicator cover below and vertically aligned with the first level indicator and connected to the second float to be responsive to changes in the level of the surface of the second liquid and thereby provide a visual indicator of the level of the second liquid in the tank.

7. The combination of claim 6, wherein the first level indicator has a vertical passage extending through the first level indicator from an upper end to a lower end, wherein the second level indicator is connected to the second float with an elongated flexible connector, and wherein the flexible connector extends through the vertical passage of the first level indicator to be slidable relative to the first level indicator.

8. The combination of claim 7, wherein the first level indicator has a cylindrical body with a vertical slot formed along an outer surface thereof and a tube positioned in the vertical slot and connected to the cylindrical body, the tube defining the vertical passage through which the elongated connector extends.

9. The combination of claim 6, wherein the scale has a level indicator cover extending along the vertical axis of the scale in which each of the first level indicator and the second level indicator is positioned.

10. The combination of claim 9, wherein the level indicator cover is a transparent tube.

11. The combination of claim 6, wherein the panel member is provided with a plurality of markings extending from a lower end of the panel member to an upper end of the panel member.

12. A method for installing a liquid level gauge in a storage tank containing at least a first liquid and a second liquid, the storage tank having a sidewall with an exterior surface, the method comprising the steps of:

positioning a scale on the exterior surface of the sidewall of the storage tank, the scale having a plurality of markings extending from a lower end of the scale to an upper end of the scale;

positioning a first float in the storage tank, the first float being weighted to maintain buoyancy on the surface of the first liquid;

positioning a second float in the storage tank, the second float being weighted to maintain buoyancy on the surface of the second liquid;

connecting a first level indicator to the first float so the first level indicator is suspended adjacent the scale to be responsive to changes in the level of the surface of the first liquid and thereby provide a visual indicator of the level of the first liquid in the storage tank; and connecting a second level indicator to the second float so the second level indicator is suspended below and vertically aligned with the first level indicator to be responsive to changes in the level of the surface of the second liquid and thereby provide a visual indicator of the level of the second liquid in the storage tank.

13. The method of claim 12, wherein the step of connecting the second level indicator to the second float further comprises extending an elongated flexible connector through the first level indicator and connecting the second level indicator to the second float with the flexible connector so the flexible connector is slidable relative to the first level indicator.

14. The method of claim 12, further comprising the step of spacing the first float laterally relative to the second float.

15. The method of claim 12, further comprising positioning each of the first level indicator and the second level indicator in a level indicator cover to shield the first level indicator and the second level indicator from weather elements.

* * * * *